United States Patent [19]
Kamoda et al.

[11] Patent Number: 5,581,316
[45] Date of Patent: Dec. 3, 1996

[54] CAMERA ENABLING RECYCLING OF PARTS RETRIEVED FROM A LENS FITTED PHOTOGRAPHIC FILM UNIT

[75] Inventors: Takashi Kamoda, Omiya; Takashi Mashiko; Toshio Yoshida, both of Ibaraki, all of Japan

[73] Assignee: Fuji Photo Optical Co. Ltd., Omiya, Japan

[21] Appl. No.: 384,644

[22] Filed: Feb. 6, 1995

[30] Foreign Application Priority Data

Feb. 7, 1994 [JP] Japan .................................. 6-034124
Feb. 7, 1994 [JP] Japan .................................. 6-034125

[51] Int. Cl.[6] .............................. G03B 1/02; G03B 15/05; G03B 17/02
[52] U.S. Cl. ............................ 396/6; 396/401; 396/176
[58] Field of Search ........................... 354/149.11, 202, 354/212, 214, 288, 204

[56] References Cited

U.S. PATENT DOCUMENTS

5,235,364  8/1993  Ohmura et al. ................... 354/149.11
5,410,378  4/1995  Tasaka et al. ..................... 354/149.11
5,436,685  7/1995  Yamashina ........................ 354/149.11

*Primary Examiner*—A. A. Mathews
*Attorney, Agent, or Firm*—Ronald R. Snider

[57] ABSTRACT

The present invention provides a camera enabling effective use of parts retrieved from a used lens-mounted film. Members retrieved from a lens-mounted film and responsible for film feed and release operation; such as, a sprocket, a sprocket axis with a charge cam attached, a drive lever, and a locking lever are mounted in a camera as they are. A release mechanism is included to release a frame stop state set for frame-by-frame film feed and a state in which the turn of a film wind knob is disabled, whereby film rewind is enabled. A strobe circuit board containing a strobe flashing unit and a control circuit is recycled for a camera permitting film rewind. In this case, a flashing capacitor mounted on the retrieved strobe circuit board is angled at lead wires so that the flashing capacitor can be placed in any state different from the one in a lens-mounted film. Moreover, electric connections for the retrieved strobe circuit board are made readily by adding coupling means having contacts and connecting the strobe circuit board to a battery via the coupling means.

6 Claims, 7 Drawing Sheets

CAMERA ENABLING RECYCLING OF PARTS RETRIEVED FROM A LENS FITTED PHOTOGRAPHIC FILM UNIT

BACKGROUND OF THE INVENTION

This application claims the priority of Japanese Patent Applications Nos. 6-34124 and 6-34125 filed on Feb. 7th, 1994, which are incorporated herein by reference.

1. Field of the Invention

The present invention relates to a constitution enabling recycling of given parts of a returned lens fitted photographic film unit for a film-replaceable camera.

2. Description of the Related Art

In the past, lens fitted photographic film unit (simplified cameras) have been widely adopted as disposable cameras. Such a lens fitted photographic film unit is easily available and can be handed to a developing agent as it is on completion of photography. A supplier of lens fitted photographic film unit can take back the film at the time of development. Given parts retrieved from the film are recycled as parts for a new lens fitted photographic film unit as they are.

The lens fitted photographic film unit merely feeds film unidirectionally and solely has simple components essential to photography. A film rewind mechanism is therefore not included. The housing and package of the lens fitted photographic film unit are designed to be strong enough to withstand exposures performed on one roll of film. Thus, efforts have been made to reduce manufacturing cost.

Figure 9:
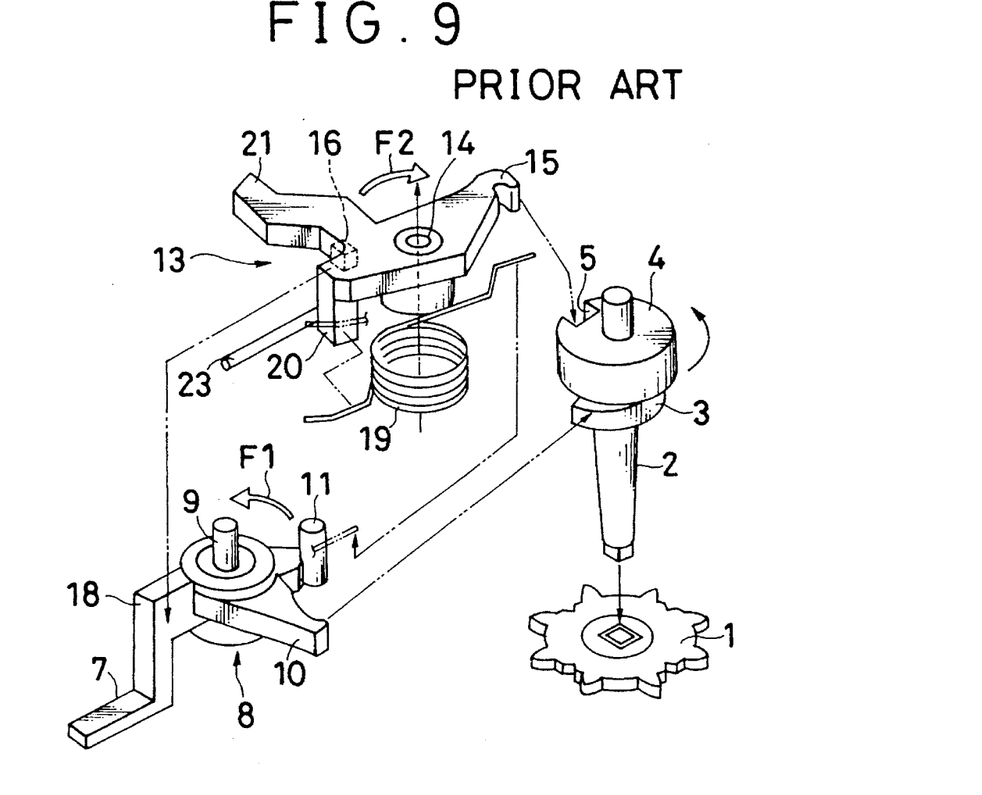
FIG. 9 shows components responsible for film feed and shutter operation which are employed in a conventional lens fitted photographic film unit.

FIG. 9 shows components responsible for film feed and shutter operation in a conventional lens fitted photographic film unit. In FIG. 9, a sprocket 1 engages with perforations of film. An axis 2 of the sprocket 1 is provided with a charge cam 3 for charging a shutter with spring constraining force required for driving the shutter and a film wind stoppage cam 4 for stopping film frame by frame. A stoppage recess 5 is formed in the film wind stoppage cam 4. A drive lever 8 having a drive 7 is placed in order to cause a sector that is not shown to pivot. Shutter operation is executed when the drive 7 kicks an upper projection of the sector. The drive lever 8 is supported rotatably about an axis. An arm 10 serving as a follower that abuts on the charge cam 3 is projecting from one side surface of the drive lever 8. A spring stopper 11 is formed at a back end of the drive lever 8.

A stoppage lever 13 is supported rotatably about an axis 14, and has a first claw 15 that is fitted into the stoppage recess 5 in the film wind stoppage cam 4. An abutment 16 is attached to the bottom of the stoppage lever 13 and positioned so that it comes into contact with the front right-hand surface of a bent 18 of the drive lever 8. A spring 19 serving as a constraining member is placed as a lower member of the axis 14 of the stoppage level 13. One end of the spring 19 is anchored by a protrusive strip 20 that is a lower part of the stoppage lever 13, and the other end thereof is anchored by the spring stopper 11 of the drive lever 8. By means of the spring 19, as indicated with arrows F1 and F2, the drive lever 8 is constrained to turn counterclockwise (viewed from above) and the stoppage lever 13 is constrained to turn clockwise. The stoppage lever 13 has a second claw 21 that engages with a tooth formed along the outer circumference of a film wind knob that is not shown.

Figure 10A:
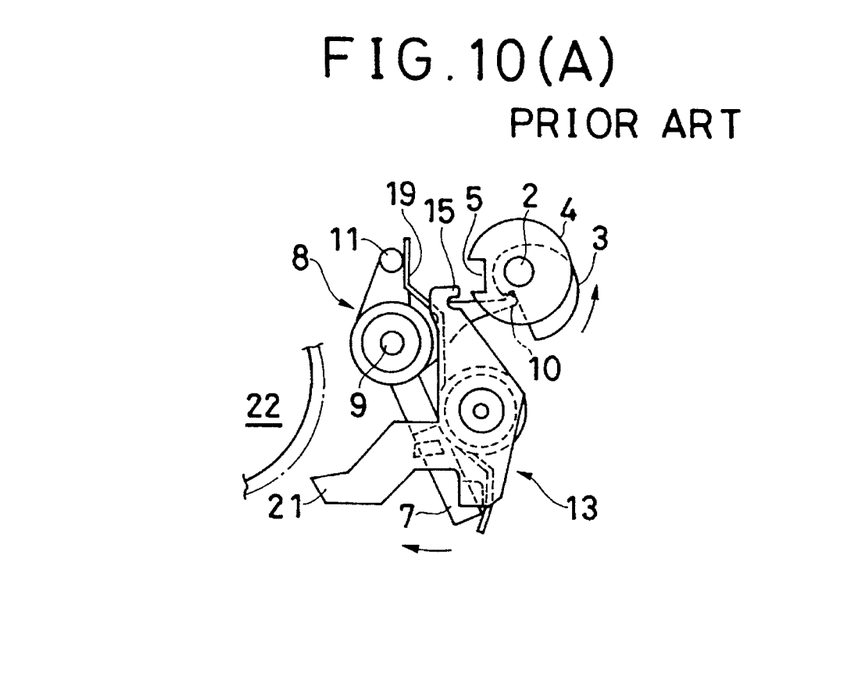
FIG. 10A shows the slates of the components shown in FIG. 9 after release operation is completed.
Figure 10B:
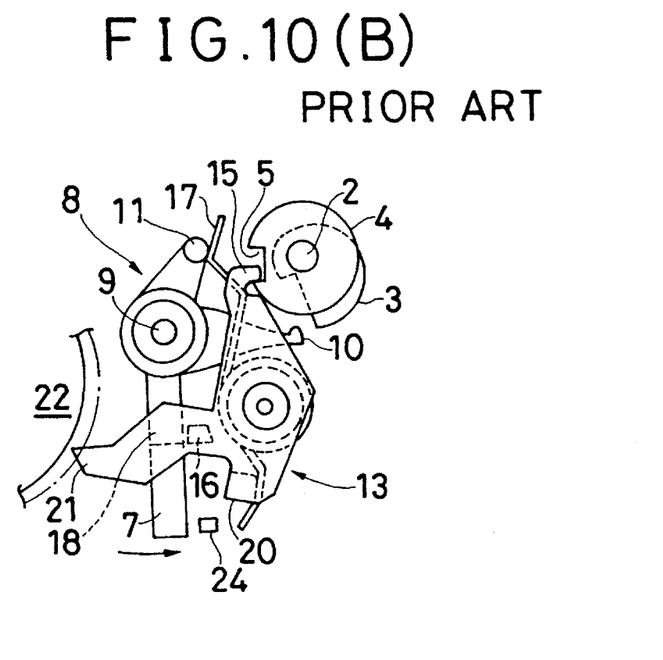
FIG. 10B shows a state in which a shutter is charged with force by means of the components shown in FIG. 9.

FIGS. 10A and 10B show states of actions made by the foregoing components. After release operation is completed, when film is wound in the state shown in FIG. 10A, the charge cam 3 turns counterclockwise and engages with the arm 10. This causes the drive lever 8 to turn clockwise resistively to spring constraining force. When the arm 10 passes over the maximum-diameter portion of the charge cam 3 and parts from the charge cam 3, the constraining force of the spring 19 constrains the drive lever 8 to turn counterclockwise. At this time, as shown in FIG. 10B, the bent 18 of the drive lever 8 abuts on the abutment 16 of the stoppage lever 13. Furthermore, the first claw 15 of the stoppage lever 13 is fitted into the stoppage recess 5 in the film wind stoppage cam 4 and the second claw 21 thereof is engaged with an outer-circumferential tooth of the film wind knob 22.

As mentioned above, the drive lever 8 enters a charging state. When the claws 15 and 21 of the locking lever 13 are locked, frame-by-frame stop (wind stop) is executed and the film wind knob 22 is immobilized. An acting member 23 interlocked with a shutter button (FIG. 9) is used to move the protrusive strip 20 of the stoppage lever 13 to the right in FIG. 9. The bent and abutment 16 are freed from each other, causing the drive lever 8 to turn counterclockwise in the state shown in FIG. 10B. A projection 24 formed as an upper part of a sector is then kicked by the drive 7. With the pivoting of the sector, opening and closing of a shutter is executed.

Figure 11:
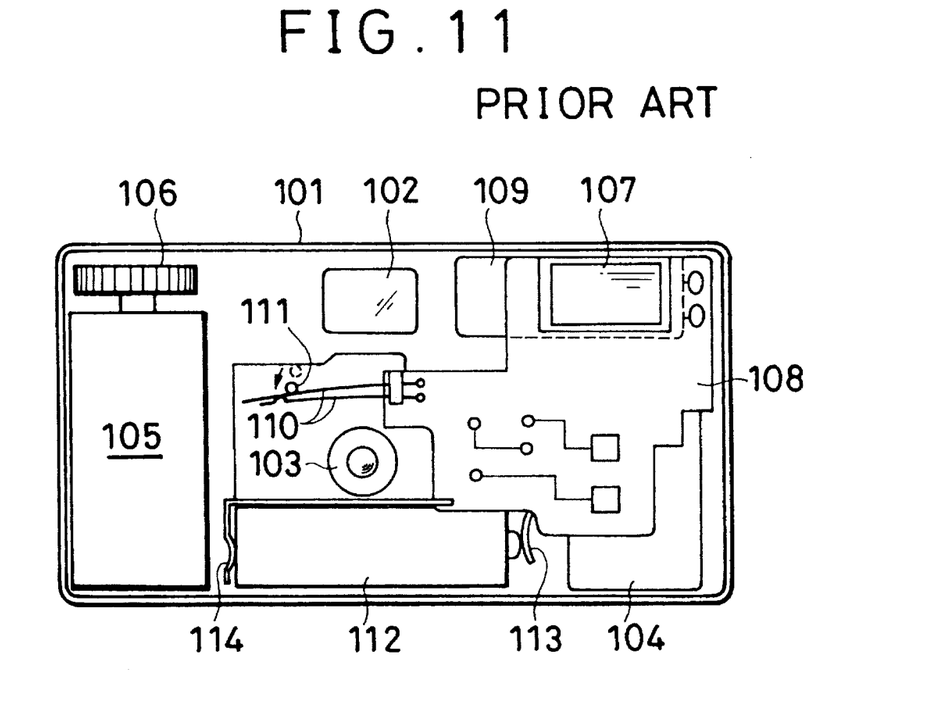
FIG. 11 shows a conventional lens fitted photographic film unit with a front cover removed.

FIG. 11 shows layout in a conventional lens fitted photographic film unit permitting strobe flashing, wherein a front cover is removed. A body 101 has a viewfinder 102 and a photographing lens 103. A film stowage 104 in which unexposed film is wound up in advance is located at the right-hand end of the body 101, and a Patrone chamber 105 in which exposed film is wound about a Patrone is located at the left-hand end thereof. A film wind knob 106 for winding exposed film frame by frame is placed on the top of the Patrone chamber 105. A strobe circuit board 108 containing a strobe flashing unit 107 is mounted. A springy switch 110 for detecting the open or stop state of a shutter is extending near above the photographing lens 103. The switch 110 is turned on by a projection 111 that is interlocked with the pivoting of the sector incorporated. Furthermore, a battery 112 is placed on the bottom of the body 101. The output of the battery 112 is supplied to circuits formed on the strobe circuit board 108 via electrode terminal plates 113 and 114.

According to the foregoing layout, for executing strobe flashing, a charging switch that is not shown is used to deliver given charges from the battery 112 to a capacitor 109. After charging is completed, when the shutter button is pressed, the switch 110 detects the opening of the sector. Based on the result of the detection, flashing is executed. When the shutter is open, the strobe flashing unit 107 flashes light.

Even in the field of ordinary cameras permitting film replacement (bidirectional film feed), since there is an increasing demand for inexpensive cameras, it is required to reduce the number of component parts and the man-hours for assembly. On the other hand, if parts retrieved from aforesaid lens fitted photographic film unit can be recycled for other products rather than the lens-mounted film, the application range of retrieved parts expands. Parts retrieval will be highly appreciated. In particular, the component members responsible for film feed and shutter operation, which are described in conjunction with FIGS. 9 and 10, have relatively long service lives and complex components. These component members are therefore worth recycling. The recycling has a significant meaning in terms of cost reduction.

The circuit members responsible for strobe flashing, which are described in conjunction with FIG. 11, include a flash lamp and a capacitor, have relatively long service lives, and are worth recycling cost-wise.

SUMMARY OF THE INVENTION

Accordingly, an object of the present invention is to effectively utilize waste articles by recycling members of a returned lens fitted photographic film unit, which are responsible for film feed and shutter operation, for a normal film-replaceable camera, to reduce cost of manufacturing a camera, and to provide a camera enabling recycling of parts retrieved from a lens fitted photographic film unit so that a film rewind mechanism required for enabling film replacement can be realized with simple components.

Another object of the present invention is to provide a camera enabling recycling of parts retrieved from a lens fitted photographic film unit so that members of a returned lens fitted photographic film unit responsible for strobe flashing can be recycled for a normal film-replaceable camera.

In order to achieve the above objects, a camera enabling recycling of parts retrieved from a lens fitted photographic film unit film according to the the present invention is characterized in that parts retrieved from a lens fitted photographic film unit are recycled for a camera permitting film rewind. The retrieved parts include part or the whole of a mechanism for controlling frame-by-frame film feed and executing release operation using spring constraining force charged during the film feed. For using the parts, it is essential to include a release mechanism for releasing film feed in order to enable film rewind.

The release mechanism may be composed of an acting member having an action button protruding outward, a freer means for freeing a shutter drive lever and a charge cam from each other responsively to an action of the acting member, and a freer means for freeing a locking lever from a film wind stoppage cam interlocked with a sprocket and a film wind knob responsively to an action of the acting member.

A plate type elastic member lies so as to constrain the acting member to move toward the action button. Preferably, a claw is formed as part of the elastic member so that it engages with a ratchet attached to the film wind knob and disengages from the ratchet responsively to an action of the acting member, and included in the release mechanism.

According to the aforesaid layout, members retrieved from a lens fitted photographic film unit, for example, a sprocket, a sprocket axis about which a charge cam is attached, a drive lever, a locking lever, and a spring are mounted in a normal camera as they are. At this time, a frame stop state set for frame-by-frame film feed and a state in which the turn of a film wind knob is disabled are released so that film reed is released in order to enable film rewind. When an acting member is moved by pressing an action button, a projection of the locking lever is pressured. This causes the locking lever to make a turn and free a film wind stoppage cam interlocked with the sprocket and a film wind knob. Furthermore, for example, when the drive lever is separated from the charge cam by means of a guide, the frame stop state of film and the state in which the turn of the film wind knob is disabled are released. A claw for engaging with a ratchet for preventing reverse turn is formed as part of a plate type elastic member for use in resetting the moved acting member to a home position. When the acting member is moved, the state in which the reverse turn of the film wind knob is prevented is released at the same time. Using these components, a release mechanism can be realized simply.

The retrieved parts include a strobe circuit board containing a strobe flashing unit, a detection switch for detecting the open or closed state of a sector, and circuits for causing a strobe to flash light according to the detection switch. The present invention is characterized in that the retrieved strobe circuit board is recycled for a camera permitting film rewind. For the purpose of the recycling, a flashing capacitor mounted on the retrieved strobe circuit board is angled at lead wires. Thus, the capacitor can be located at any position different from the one in a lens fitted photographic film unit.

For mounting the retrieved strobe circuit board, when a section of a camera permitting film rewind in which a strobe circuit board is to be placed has the same structure and layout as a corresponding section of a lens fitted photographic film unit, the retrieved strobe circuit board can be mounted as it is. However, as far as a capacitor is concerned, it is placed in the upper part of a lens fitted photographic film unit while it is located along a side surface of a camera permitting film rewind. A capacitor is located along a side surface of a camera because it is required to include a film rewind knob for use in rewinding film. A capacitor mounted on a circuit board is therefore angled at lead wires and placed along a side surface of a camera.

For making connections in the course of mounting the retrieved strobe circuit board, it is preferred to include a first contact that abuts on one electrode terminal plate of the retrieved strobe circuit board, a coupling means for coupling the first contact with one electrode terminal plate of a battery stowage, a second contact for holding a lead wire of the flashing capacitor, and a coupling means for coupling the second contact with the other electrode terminal plate of the battery stowage.

A battery is placed on the bottom of a lens-mounted film, while it is located along a side surface of a camera permitting film rewind. In the latter case, one electrode terminal plate (for example, positive electrode) of a battery stowage is coupled with one electrode terminal plate of a strobe circuit board by way of a coupling member. At the same time, the other electrode terminal plate (for example, negative electrode) of the battery stowage is coupled with a lead wire (negative) of a capacitor by way of a coupling member. This structure is advantageous in that battery power can be supplied to the strobe circuit board readily without making the connection between a camera and the strobe circuit board complex. That is to say, since the other (negative) battery electrode plate of the strobe circuit board is detachable, when the electrode plate is detached, interference with other members is avoided. Freedom in designing expands.

In a camera permitting film rewind in accordance with the present invention, it is preferred that some or all of the parts constituting a mechanism responsible for film feed and release operation as well as a retrieved strobe circuit board are recycled as parts retrieved from a lens fitted photographic film unit.

DETAILED DESCRIPTION OF THE PREFERRED EMBODIMENTS

Figure 1:
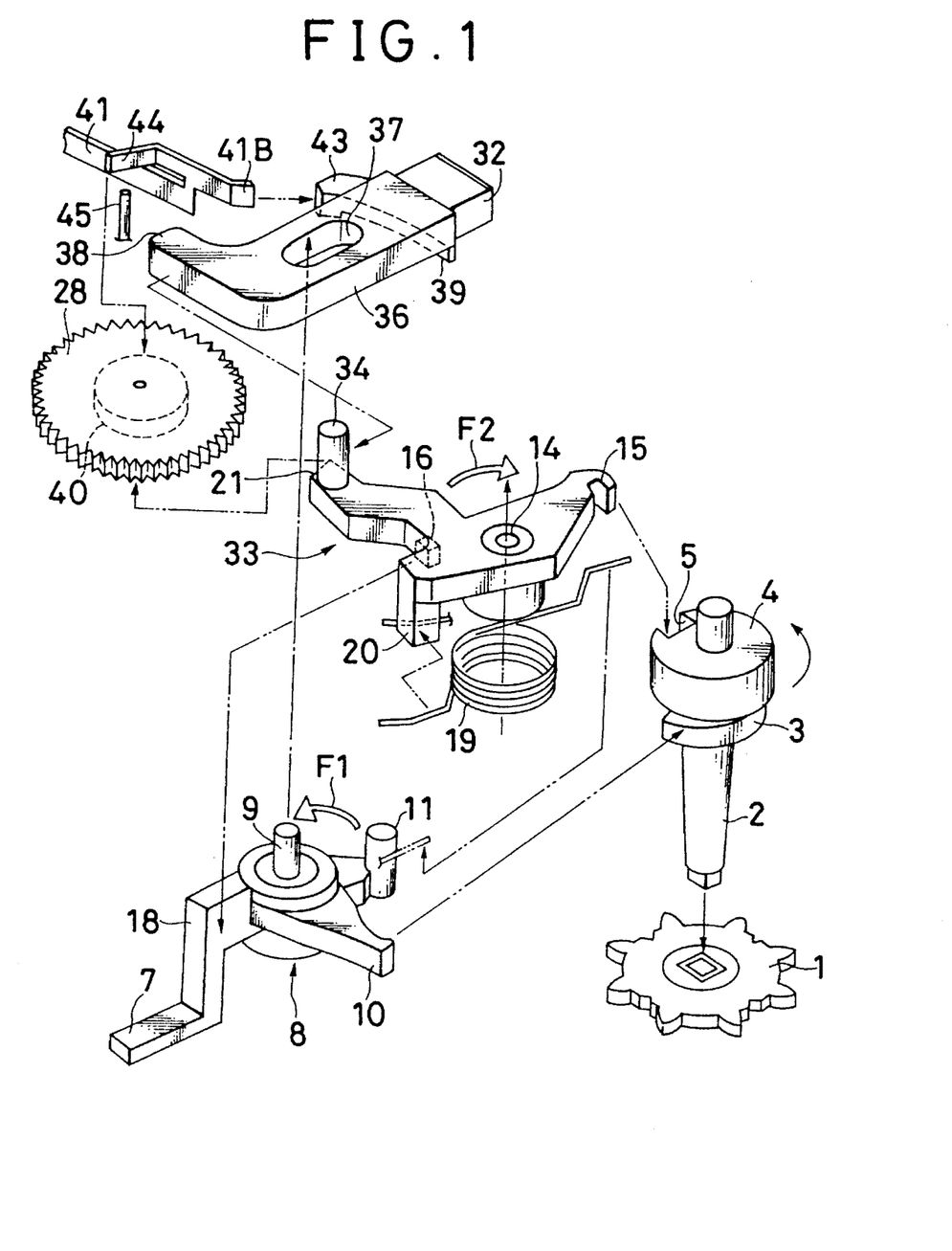
FIG. 1 is an exploded perspective view showing components responsible for film feed and shutter operation in a camera enabling recycling of parts retrieved from a lens fitted photographic film unit according to the first embodiment.
Figure 2:
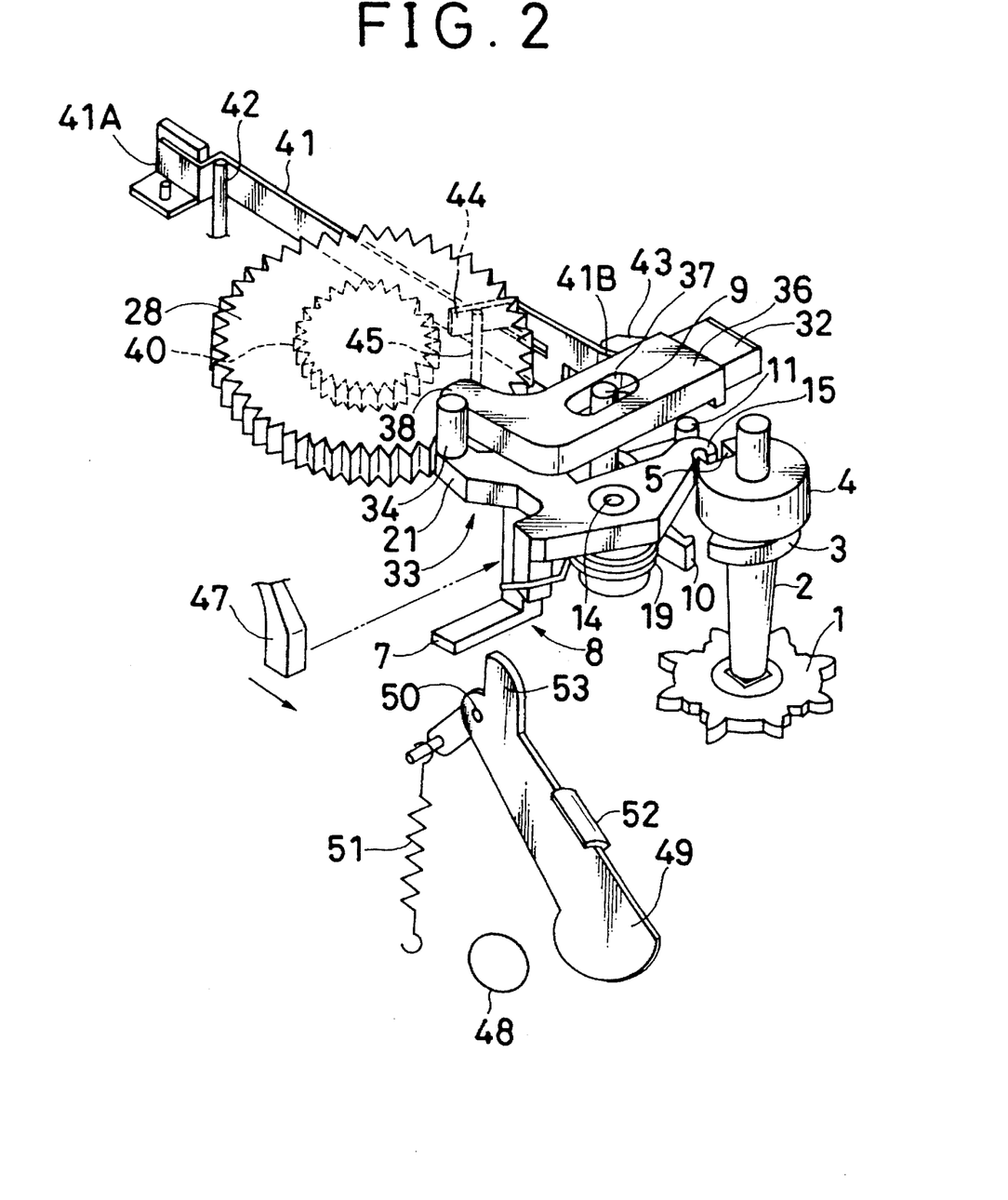
FIG. 2 is a perspective view showing a state in which the members in the embodiment shown in FIG. 1 are assembled.
Figure 3:
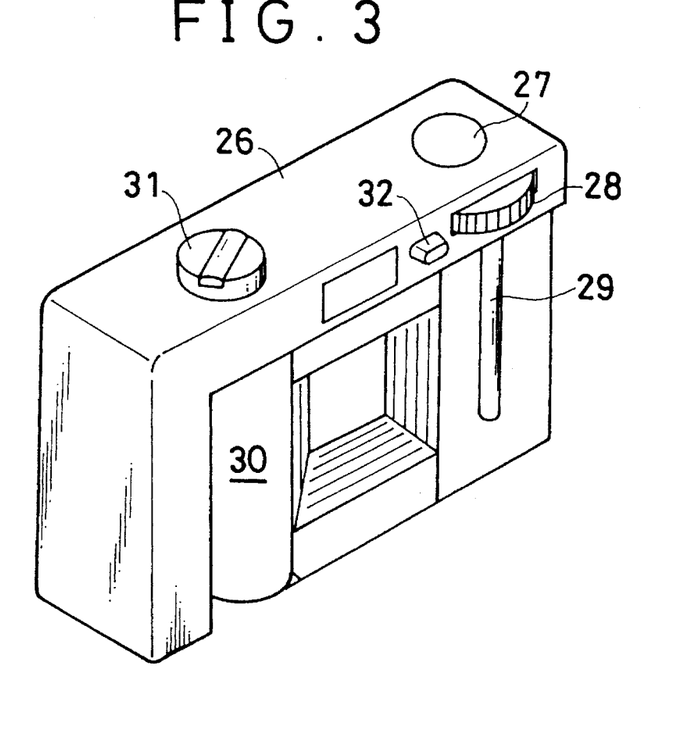
FIG. 3 is an oblique view showing a state in which a back cover is removed from the camera of the first embodiment.

FIG. 1 shows components responsible for film feed and shutter operation in a camera permitting film rewind in accordance with the first embodiment. FIG. 2 shows a state in which the members shown in FIG. 1 are assembled. FIG. 3 shows the camera of the first embodiment with a back cover thereof removed. In FIG. 3, a shutter button 27 and a film wind knob 28 are located in the right-hand part of a body 26. When the film wind knob 28 is turned counterclockwise, exposed film is wound about a takeup axis 29. A Patrone chamber 30 and a film rewind knob 31 are arranged in the left-hand part of the body 27. After a roll of film is exposed, the film rewind knob 31 is used to rewind film into the Patrone chamber. A action button 32 for use in releasing film feed for enabling film rewind, which will be described later, is located in the vicinity of the film wind knob 28.

In FIG. 1, a sprocket 1 that engages with perforations in film, a charge cam 3 for charging a shutter with driving force (spring constraining force), a film wind stoppage cam 4 for stopping film frame by frame, a drive lever 8 having a drive 7, and a spring 19 are parts retrieved from a lens fitted photographic film unit as described in conjunction with FIG. 9. As for a locking lever 33, it has a freer pin 34 formed on a second claw 21. The locking lever 33 may be produced independently. Alternatively, a lens-mounted film may be designed to use the locking lever 33 having the freer pin 34, and then the locking lever 33 may be retrieved from the lens-mounted film for the purpose of recycling.

An acting member 36 having an action button 32 is placed above the drive lever 8. An axis 9 of the drive lever 8 is fitted into a slidable ditch 37 in the acting member 36. A distal end 38 of the acting member 36 is positioned so that it can push forward the freer pin 34 formed on the locking lever 33. A guide (wall) 39 is formed askew on the bottom of the acting member 36 so that it allows the drive lever 8 to turn clockwise and frees it. The distal end 38 and guide 39 cooperate in releasing a frame stop state and a state in which the turn of the film wind knob is disabled. To be more specific, teeth are formed along the outer circumference of the film wind knob 28, and the second claw 21 of the locking lever 33 engages with any of the outer-circumferential teeth. When the shutter is charged with driving force (FIG. 10B), the turn of the film wind knob 28 is disabled. The film wind stoppage cam 4 (stoppage recess 5) and a first claw 15, which are interlocked with the sprocket 1, cooperate in stopping film frame by frame.

Figure 4:
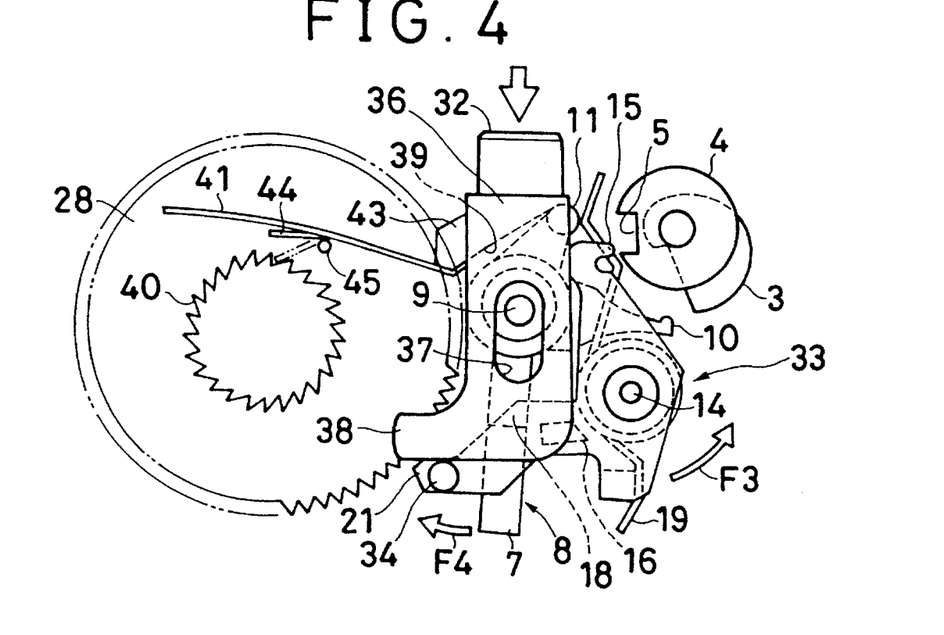
FIG. 4 shows actions made in the first embodiment.

However, when the distal end 38 of the acting member 36 pushes the freer pin 34, as shown in FIG. 4, time locking lever 33 turns counterclockwise or in the direction of arrow F3. The second claw 21 is therefore disengaged from the outer-circumferential tooth formed on the film wind knob 28, and the first claw 15 is also freed from the film wind stoppage cam 4. The guide 39 of the acting member 36 allows the drive lever 8 to turn clockwise or in the direction of arrow F4. This causes an arm 10 to part from the charge cam 3 completely. In this state, as far as a camera not having a ratchet for preventing reverse turn (which will be described later) is concerned, film feed is released and film rewind is enabled.

In the first embodiment, as illustrated, a ratchet wheel 40 is mounted on time bottom of the film wind knob 28 in order to reliably disable the reverse turn of the film wind knob 28. The layout described below is therefore adopted. That is to say, a flat spring 41 for constraining the acting member 36 to move toward time outer surface of the camera is located in the vicinity of the acting member 36. One end 41A of the flat spring 41 is, as shown in FIG. 2, supported by a support member 42, and the other end 41B thereof abuts on an abutment 43 formed on a side surface of the acting member 36 (along an extension of time guide 39). The flat spring 41 has a claw 44 projected obliquely forward and formed as part thereof. A freer pin 45 designed to abut on the proximal part of the claw 44 lies in front of the claw 44.

When the claw 44 engages with the ratchet wheel 40 of the film wind knob 28, film wind (counterclockwise turn) is enabled but reverse (clockwise) turn is disabled. In this embodiment, however, when the flat spring 41 is pressured responsively to pressing performed on the action button 32, since the freer pin 45 causes the tip of the claw 44 to withdraw, the claw 44 disengages from the ratchet wheel 40. Consequently, reverse-turn prevention is released.

As shown in FIG. 2, an acting member 47 interlocked with the shutter button 27 shown in FIG. 3 is located on the side of a projection 20 of the locking lever 33 on which a spring 19 is not transversing. A sector (a shutter leaf) 49 lies behind an aperture 48 so as to pivot with an axis 50 as a center. The sector 49 is constrained to pivot counterclockwise by means of a spring 51. The range of pivoting is restricted by a wall 52 of a housing. A projection 53 to be kicked by the drive 7 is formed as the upper part of the sector 49. When the shutter button is pressed, the acting member 47 causes the locking lever 33 to turn counterclockwise. An abutment 16 then parts from a bent 18. This causes the drive lever 8 to make a turn. The drive 7 then kicks the projection 53. This causes the sector 49 to pivot, thus opening the aperture 48.

The first embodiment has the foregoing components. The operation of a release mechanism in the first embodiment will be described in conjunction with FIG. 4. In FIG. 4, after the last frame of film is exposed, when the action button 32 is pressed, the distal end 38 of the acting member 36 abuts on the freer pin 34, and the guide 39 abuts on the spring stopper 11 of the drive lever 8. As for the locking lever 33, since the distal end 38 pushes the freer pin 34, the first claw 15 is freed from the stoppage recess 5 and the second claw 21 is disengaged from the film wind knob 28. The spring stopper 11 slides along the guide 39, causing the drive lever 8 to turn clockwise. Consequently, the arm 10 Is freed from the charge cam 3.

Furthermore, since the abutment 43 of the acting member 36 causes the flat spring 41 and claw 44 to move forward, the claw 44 is disengaged from the ratchet wheel 40 because the proximal portion thereof is pressured by the freer pin 45. Thus, film reverse-turn prevention is fully released. The above operation of the release mechanism shown in FIG. 4 are exerted even after shutter release operation is performed, after the drive lever 8 is charged with force, or after film runs out while being wound for another frame. In whatever state film comes to an end, exposed film can be rewound using the film wind knob 31 shown in FIG. 3. The film can then be replaced with a new one.

In the aforesaid embodiment, the sprocket 1, axis 2, charge cam 3, film wind stoppage cam 4, drive lever 8, and spring 19 can be procured using parts of a lens fitted photographic film unit disposed of. It is substantially possible to reduce the number of parts and diminish manufacturing processes.

As described above, according to the first embodiment, some or all of parts that are responsible for film feed and shutter operation and retrieved from a lens fitted photographic film unit can be used effectively. It is therefore substantially possible to reduce the number of parts and diminish manufacturing processes. This results in a reduction in the cost of manufacturing a camera. Another advantage lies in that a release mechanism can be realized with simple components.

Second Embodiment

Figure 5:
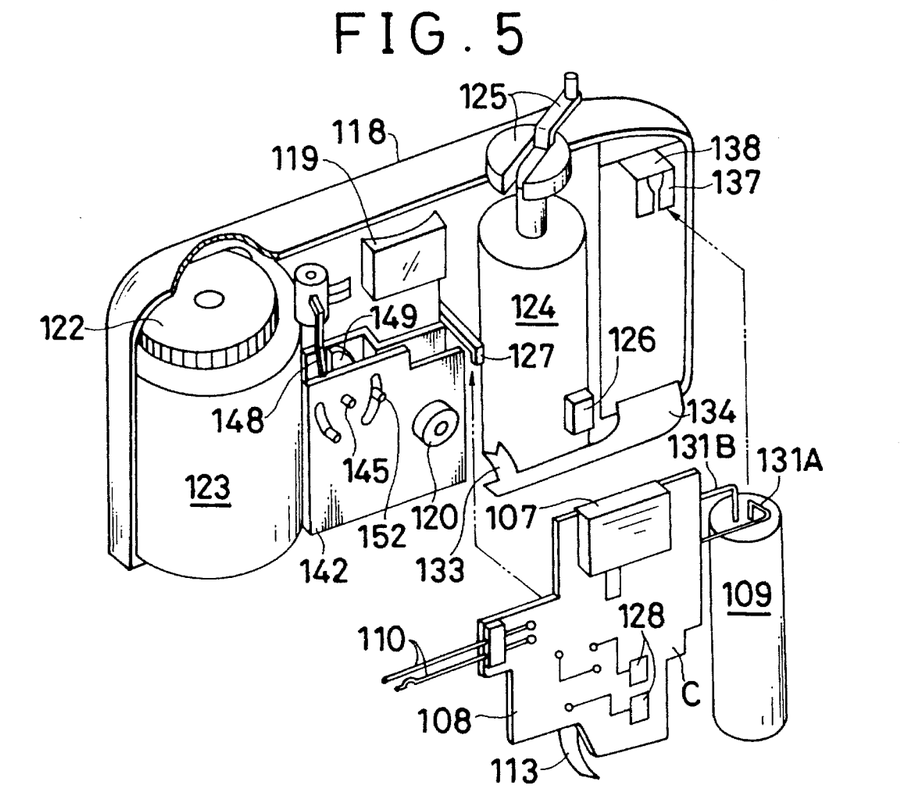
FIG. 5 is an oblique view showing layout in a camera enabling recycling of parts retrieved from a lens fitted photographic film unit film according to the second embodiment, and depicting a state in which a strobe circuit board is about to be mounted.
Figure 6:
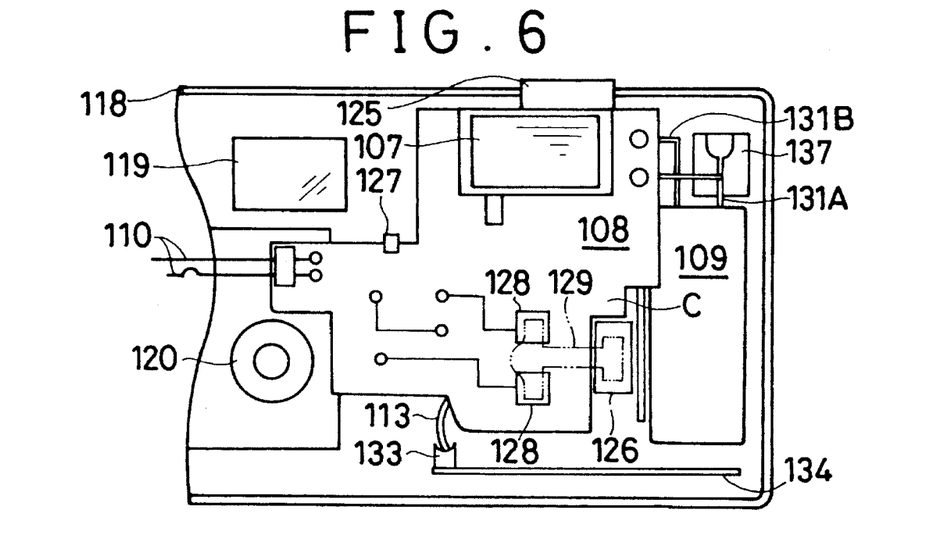
FIG. 6 shows a state in which the strobe circuit board has been mounted in the second embodiment.
Figure 7:
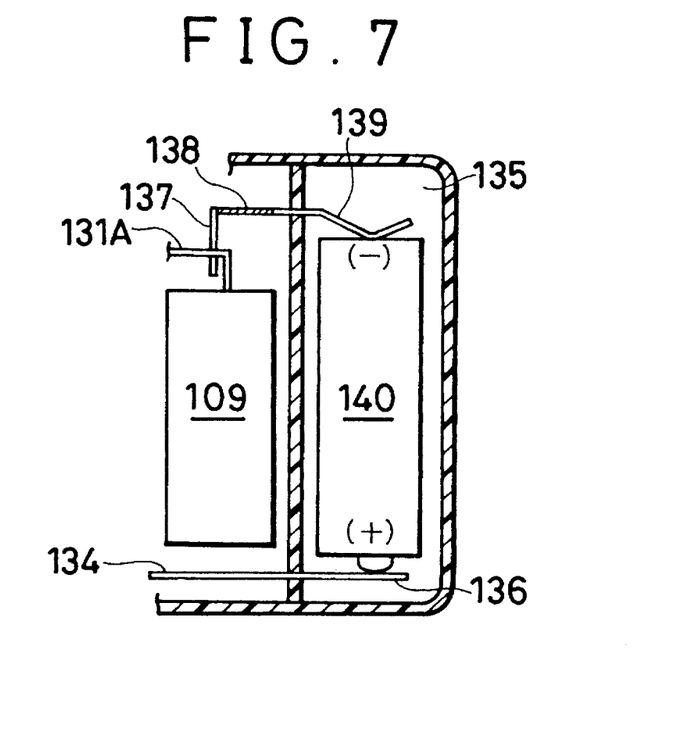
FIG. 7 is a sectional view showing a capacitor and a butter placed along a side surface in the second embodiment.
Figure 8:
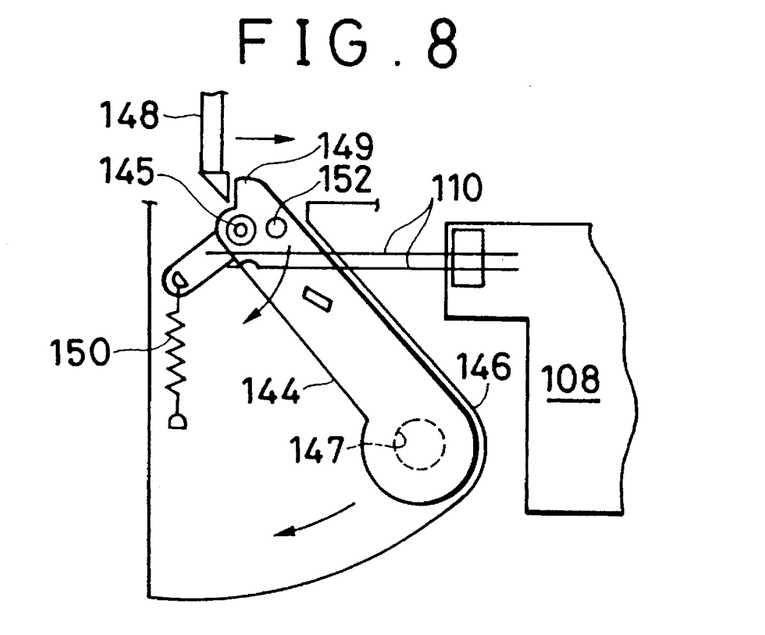
FIG. 8 shows a structure of a shutter in the second embodiment with a partition removed.

FIG. 5 shows layout in a camera permitting film rewind in accordance with the second embodiment. FIG. 6 shows a state in which a strobe circuit board is mounted in the camera. FIG. 7 shows a capacitor and a battery placed along a side surface of the camera. FIG. 8 shows a structure of a shutter. In FIG. 5, a body 118 has a viewfinder 119 and a photographing lens 120. A film takeup chamber 123 for taking up exposed film about a takeup axis is located at the left-hand end in the body in FIG. 5. A film wind knob 122 for winding film frame by frame is placed on the top of the film takeup chamber 123. A Patrone chamber 124 is located on the right hand of the photographing lens 120. A film rewind knob 125 is mounted above the Patrone chamber 124. When the last frame of film is exposed, the film is rewound into the Patrone chamber using the film rewind knob 125.

A strobe circuit board 108 retrieved from a lens fitted photographic film unit shown in FIG. 11 is to be mounted in the body 118 having the aforesaid layout. In the camera of this embodiment, a positioner 126 is formed as part of a housing in front of the Patrone chamber 124. Moreover, a retention claw 127 is interposed between the Patrone chamber 124 and the photographing lens 120. The positioner 126 is, as shown in FIG. 6, used to position a corner C of the strobe circuit board 108. In this state, the retention claw 127 retains the strobe circuit board 108. Mounted on the strobe circuit board 108 include, as described in conjunction with FIG. 11, a strobe flashing unit 107, a capacitor 109, a switch 110 for detecting the open state of a sector, an (positive) electrode terminal plate 113, and a control circuit. Electrode pads 128 constituting a switch for starting charging of the capacitor 109 are included in the circuit pattern. When a switch plate 129 (chain line) shown in FIG. 6 touches the electrode pads 128, charging starts.

In this embodiment, the capacitor 109 for the strobe circuit board 108 is angled from a horizontal position (FIG. 11) along the top of the camera to a vertical position (FIG. 5) along a side surface thereof. Specifically, in a lens fitted photographic film unit in which the capacitor 109 is placed along the top of the film, lead wires 131A and 131B that are metallic lines are bent horizontally from the capacitor 109 to the strobe circuit board 108 and then coupled with given terminals. In the camera of this embodiment, since the film rewind knob 125 for rewinding film must be included, the capacitor 109 is not placed along the top of the camera but placed along a side surface thereof. The lead wires 131A and 131B are therefore bent vertically, so that the capacitor 109 can be placed along the side surface of the camera.

In the second embodiment, the layout described below is adopted in order to place a battery, which lies on the bottom of a lens fitted photographic film unit, along a side surface of the body 118. Specifically, a coupling member 134 made of a plate type conducting material and provided with a springy first contact 133 is placed on the bottom of the body 118 so that the (positive) first electrode terminal plate 113 of the strobe circuit board 108 can abut against the first contact 133. The coupling member 134 is extending to the battery stowage 135 shown in FIG. 7. Along the side surface of the camera shown in FIG. 7, the battery stowage 135 lies behind a space in which the capacitor 109 is to be mounted. An end of the coupling member 134 lying in the lower part of the battery stowage 135 serves as one electrode terminal plate 136.

A second contact 137 is holding the other (negative) lead wire 131A of the capacitor 109. The second contact 137 is electrically coupled with the other electrode terminal plate 139 lying in the upper part of the battery stowage 135 via a conductive coupling member 138. In this embodiment, when coupled with the first contact 133, the electrode terminal plate 113 of the strobe circuit board 108 is connected with the positive electrode of a battery 140 via the coupling member 134 and lower electrode terminal plate 136. The lead wire 131A of the capacitor 109 is connected to the negative electrode of the battery 140 via the coupling member 138 and upper electrode terminal plate 139. In other words, the other electrode terminal plate 114, shown in FIG. 11, which is detachable is substituted for by the lead wire 131A. The lead wire 131A serves as a connection line leading to both the capacitor 109 and the negative electrode of the battery.

FIG. 8 shows the shutter shown in FIG. 5 with a partition 142 removed. In this embodiment, a kicker type shutter is employed. In FIG. 8, a sector 144 can freely pivot with an axis 145 as a center within a shutter housing 146. The sector 144 is disposed so that the distal end thereof blocks an aperture 147. A projection 149 with which a drive 148 of a drive lever comes into contact is formed as the top of the sector 144. The sector 144 is constrained to turn counterclockwise by means of a spring 150. The drive 148 kicks the projection 149 responsively with an action of a shutter button. This causes the sector 144 to pivot clockwise. The aperture 147 then opens. Thus, shutter operation is executed.

The sector 144 has a pin 152 formed in the vicinity of the axis 145. A switch 110 of the strobe circuit board 108 is disposed as illustrated below the pin 152. When the sector 144 pivots, the pin 152 turns clockwise with the axis 145 as a center. With the turn of the pin 152, the switch 110 is turned on in the same manner as the convention one shown in FIG. 11. Conversely, when the switch 110 is on, it is detected that the sector 144 has pivoted. Based on the result of the detection, circuits concerned cause the capacitor 109 to discharge electricity. Eventually, the strobe flashing unit 107 flashes light.

The second embodiment has the foregoing components. Owing to the components, the strobe circuit board 108 having been employed in a lens fitted photographic film unit can be mounted in a camera permitting film rewind. The strobe circuit board 108 is supported by the positioner 126 and retention claw 127. The electrode terminal plate 113 abuts against the first contact 133 and the lead wire 131A of the capacitor 109 is held by the second contact 137 formed as part of the coupling member 108, whereby the supplemental effect of supporting the strobe circuit board 108 is exerted. The capacitor 109 in this embodiment is angled at the lead wires 131A and 131B and thus placed at any position different from the one in a lens fitted photographic film unit. Furthermore, the coupling member 134 having the first contact 133 is used to connect the electrode terminal plate 113 of the strobe circuit board 108 to the electrode terminal plate 136 of the battery stowage 135, and the coupling member 138 having the second contact 37 is used to couple the lead wire 131A of the capacitor 109 with the electrode terminal plate 139 of the battery stowage 135. The battery 140 can therefore be located at any position different from the one in a lens-mounted film.

In the aforesaid embodiment, when a strobe is operated, the switch plate 129 shown in FIG. 6 is manipulated externally, charging is executed for the capacitor 109. Thereafter, when the sector 144 moves responsively to an action of the shutter button, the switch 110 detects that the sector 144 has disclosed the aperture. Based on a detection signal sent from the switch 110, the strobe flashing unit 107 executes flashing. Thus, photography can be carried out under the flashlight of the strobe.

As described above, according to the second embodiment, a retrieved strobe circuit board can be used effectively. Even when the location of a capacitor must be changed due to the inclusion of a film rewind mechanism, the strobe circuit board can be placed optimally. Moreover, a battery can be placed at any position different from the one in a lens-mounted film. Furthermore, interference with other members can be avoided. This enables free designing.

What is claimed is:

1. A camera enabling recycling of parts retrieved from a lens fitted photographic film unit, comprising:

some or all of parts being retrieved from a lens fitted photographic film unit and constituting a mechanism that controls frame-by-frame film feed and executes shutter release operation using spring constraining force charged during the film feed;

a release mechanism for releasing an assembly of parts responsible for film feed and shutter release operation from film feed in order to enable film rewind; and an action button protruding outward from a camera body in order to operate said release mechanism.

2. A camera enabling recycling of parts retrieved from a lens fitted photographic film unit according to claim 1, wherein:

said release mechanism includes:

an acting member connected to said action button protruding outward;

a freer means for freeing a shutter drive lever from a charge cam responsive to an action of said acting member; and a freer means for freeing both a film wind cam interlocked with a sprocket and a locking lever engaging with a film wind knob.

3. A camera enabling recycling of parts retrieved from a lens fitted photographic film unit according to claim 1, wherein:

a plate type elastic member lies so as to constrain an acting member to move toward said action button protruding outward; and said release mechanism includes a claw which is formed as part of said elastic member so that it engages with a ratchet attached to said film wind knob and which is designed to disengage from said ratchet responsively to an action of said acting member.

4. A camera enabling recycling of parts retrieved from a lens fitted photographic film unit according to claim 1, comprising:

a strobe circuit board on which parts are retrieved from a lens fitted photographic film unit.

5. A camera enabling recycling of parts retrieved from a lens fitted photographic film unit, comprising:

a film rewind mechanism;

a strobe circuit board on which parts retrieved from a lens fitted photographic film unit;

said parts comprising, a strobe flashing unit, a flashing capacitor, a detection switch for detecting the open or closed state of a sector, circuits allowing a strobe to flash light according to said detection switch, and a first electrode terminal plate;

a battery stowage having one and another electrode terminal plates provided in order to locate a battery in a vertical direction;

a first contact against which said electrode terminal plate of said retrieved strobe circuit board is abutted;

a coupling means for coupling said first contact with said one electrode terminal plate of a battery stowage;

a second contact for holding a lead wire of said flashing capacitor; and a coupling means for coupling said second contact with said another electrode terminal plate of said battery stowage.

6. A camera enabling recycling of parts retrieved from a lens fitted photographic film unit according to claim 5, wherein:

said flashing capacitor is mounted on said strobe circuit board in any state different from the one in said lens fitted photographic film unit; and wherein lead wires can be placed in any position so that one of said lead wires is held by said second contact.

* * * * *